(12) United States Patent
DelMarco (10) Patent No.: US 9,667,463 B2
(45) Date of Patent: May 30, 2017

(54) COMPANDERS FOR PAPR REDUCTION IN OFDM SIGNALS

(71) Applicant: BAE Systems Information and Electronic Systems Integration Inc., Nashua, NH (US)

(72) Inventor: Stephen P. DelMarco, North Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/646,117

(22) PCT Filed: Sep. 15, 2014

(86) PCT No.: PCT/US2014/055651
§ 371 (c)(1),
(2) Date: May 20, 2015

(87) PCT Pub. No.: WO2015/039027
PCT Pub. Date: Mar. 19, 2015

(65) Prior Publication Data
US 2015/0295744 A1 Oct. 15, 2015

Related U.S. Application Data

(60) Provisional application No. 61/878,226, filed on Sep. 16, 2013.

(51) Int. Cl.
*H04K 1/02* (2006.01)
*H04L 25/03* (2006.01)
(Continued)

(52) U.S. Cl.
CPC ........ *H04L 27/2624* (2013.01); *H04L 5/0007* (2013.01)

(58) Field of Classification Search
None
See application file for complete search history.

(56) References Cited

U.S. PATENT DOCUMENTS 5,473,279 A * 12/1995 D'Angelo ................. G06J 1/00
327/100
5,832,097 A * 11/1998 Armstrong ........... H04R 25/356
381/106

(Continued)

FOREIGN PATENT DOCUMENTS

WO      WO2008046163      4/2008
WO      PCT/US14/055651    9/2014

OTHER PUBLICATIONS

Pratt et al, "OFDM Link Performance with Companding for PAPR Reduction in the Presence of Non-Linear Amplification", Georgia Tech Research Institute, on-line publication, 2006.
(Continued)

*Primary Examiner* — Shuwang Liu
*Assistant Examiner* — Gina McKie
(74) *Attorney, Agent, or Firm* — Sand & Sebolt, LPA; Scott J. Asmus (57) ABSTRACT

A system and method use an inverse square root function (ISQR) function, in part, to compand and decompand signals. A system includes a companding processor and a transmitter. The companding processor compands input signals into companded signals using a compander function, $C\{x(n)\}$. The compander function compands the input signals based, at least in part, on an inverse square root (ISQR) function over at least a portion of a signal amplitude probability density function. The transmitter then transmits the companded signals as electromagnetic wave signals.

14 Claims, 5 Drawing Sheets

(51) Int. Cl.
  *H04L 25/49* (2006.01)
  *H04L 27/26* (2006.01)
  *H04L 5/00* (2006.01)

(56) References Cited

U.S. PATENT DOCUMENTS

| | | | | |
|---|---|---|---|---|
| 7,467,170 | B1* | 12/2008 | Chen | G06F 1/02 |
| | | | | 708/250 |
| 2003/0212551 | A1* | 11/2003 | Rose | G10L 19/24 |
| | | | | 704/230 |
| 2009/0051426 | A1* | 2/2009 | Ba | H03F 1/3247 |
| | | | | 330/149 |
| 2010/0091900 | A1 | 4/2010 | Gan | |
| 2013/0230121 | A1 | 9/2013 | Molko et al. | |
| 2014/0050271 | A1* | 2/2014 | Su | H04N 19/136 |
| | | | | 375/240.26 |

OTHER PUBLICATIONS

Jiang, "New Companding Transform for PAPR Reduction in OFDM", IEEE Communications Letters, vol. 14, No. 4, online, Apr. 2010.
X. Huang, J. Lu, J. Zheng, J. Chuang, and J Gu, "Reduction of Peak-to-Average Power Ratio of OFDM Signals with Companding Transform", Electronic Letters, vol. 37, No. 8, pp. 506-507, Apr. 2001.
X. Wang, T. T. Tjhung, and C. S. Ng, "Reduction of Peak-to-Average Power Ratio of OFDM System Using a Companding Technique", IEEE Trans. Broadcast., vol. 45, No. 3, pp. 303-307, Sep. 1999.
T. G. Pratt, N. Jones, L. Smee, and M. Torrey, "OFDM Link Performance with Companding for PAPR Reduction in the Presence of Non-linear Amplification", IEEE Trans. Broadcast., vol. 52, No. 2, pp. 261-267, Jun. 2006.
X. Wang, T. T. Tjhung, C. S. Ng, and A. A. Kassim, "On the SER Analysis of A-Law Companded OFDM System", Proc. IEEE Globecom, vol. 2, pp. 756-760, 2000.
Y. Wang, L.-H. Wang, J.-H. Ge, and B. Ai, "Nonlinear Companding Transform Technique for Reducing PAPR of OFDM Signals", IEEE Trans. Consumer Elec., vol. 58, No. 3, pp. 752-757, Aug. 2012.
Y. Rahmatallah, N. Bouaynaya, and S. Mohan, "Bit Error Rate Performance of Linear Companding Transforms for PAPR Reduction in OFDM Systems", Proc. IEEE GLOBECOM, pp. 1-5, 2011.
S. A. Aburakhia, E. F. Badran, and D. A. E. Mohamed, Linear Companding Transform for the Reduction of Peak-to-Average Power Ratio of OFDM Signals, IEEE Trans. Broadcast., vol. 55, No. 1,pp. 155-160, Mar. 2009.
X. Huang, J. Lu, J. Zheng, K.B. Letaief, and J. Gu., Companding Transform for Reduction in Peak-to-Average Power Ratio of OFDM Signals, IEEE Trans. Wireless Comm., vol. 3, No. 6, pp. 2030-2039, Nov. 2004.
C.-L. Wang, and S.-J. Ku, "A Low-Complexity Companding Transform for Peak-to-Average Power Ratio Reduction in OFDM Systems", Proc. IEEE ICASSP, vol. IV, pp. 329-332, 2006.
P. Yang, A. Hu, "Two-Piecewise Companding Transform for PAPR Reduction of OFDM Signals", Proc.7th Int'l Conf. Wireless Comm. And Mobile Computing (IWCMC), pp. 619-623, 2011.
V. Tabatabavakili, and A. Zahedi, "Reduction of Peak-to-Average Power Ratio of OFDM Signals Using a New continuous Linear Companding Transform", Proc. IEEE Int'l Symp. Telecom., pp. 426-430, 2010.
Y. Jiang, "New Companding Transform for PAPR Reduction in OFDM", IEEE Communications Letters, vol. 14, No. 4, pp. 282-284, Apr. 2010.
N. Chaudhary, and L. Cao, "Non-Symmetric Decompanding for Improved Performance of Companded OFDM Systems", IEEE Trans. Wireless Comm., vol. 6, No. 8, pp. 2803-2806, Aug. 2007.
T. Jiang, W. Xiang, P. C. Richardson, D. Qu, and G. Zhu, "On the Nonlinear Companding Transform for Reduction in PAPR of MCM Signals", IEEE Trans. Wireless Comm., vol. 6, No. 6, pp. 2017-2021, Jun. 2007.
T. Jiang, W. Yao, P. Guo, Y. Song, and D. Qu, "Two Novel Nonlinear Companding Schemes with Iterative Receiver to Reduce PAPR in Multi-Carrier Modulation Systems", IEEE Trans. Broadcast., vol. 52, No. 2, pp. 268-273, Jun. 2006.
T. Jiang, Y. Yang, and Y.-H Song, "Exponential Companding Technique for PAPR Reduction in OFDM Systems", IEEE Trans. Broadcast., vol. 51, No. 2, pp. 244-248, Jun. 2005.
T. Jiang, and G. Zhu, "Nonlinear Companding Transform for Reducing Peak-to-Average Power ratio of OFDM Signals", IEEE Trans. Broadcast., vol. 50, No. 3, pp. 342-346, Sep. 2004.
N.S.L. Phani Kumar, A. Banerjee, and P. Sircar, "Modified Exponential Companding for PAPR Reduction of OFDM Signals", Proc. Wireless Comm. and Network. Conf (WCNC), pp. 1344-1349, 2007.
S.-S. Jeng, and J.-M. Chen, "Efficient PAPR Reduction in OFDM Systems Based on a Companding Technique with Trapezium Distribution", IEEE Trans. Broadcast., vol. 57, No. 2, pp. 291-298, Jun. 2011.
J. Hou, J.H. Ge, and J. Li, "Trapezoidal Companding Scheme for Peak-to-Average Power Ratio Reduction of OFDM Signals", Electronic Letters, vol. 45, No. 25, pp. 1349-1351, Dec. 2009.
J. Hou, J. Ge, D. Zhai, and J. Li, "Peak-to-Average Power Ratio Reduction of OFDM Signals with Nonlinear Companding Scheme", IEEE Trans. Broadcast., vol. 56, No. 2, pp. 258-262, Jun. 2010.
Y. Wang, L.-H. Wang, J.-H. Ge, and B. Ai., "An Efficient Nonlinear Companding Transform for Reducing PAPR of OFDM Signals", IEEE Trans. Broadcast., vol. 58, No. 4, pp. 677-684, Dec. 2012.
T Hwang, C. Yang, G. Wu, S. Li, and G. Y. Li, "OFDM and Its Wireless Applications: A Survey", IEEE Trans. Vehicular Tech.., vol. 58, No. 4, pp. 1673-1694, May 2009.
M. Sharif, M. Gharavi-Alkhansari, and B. H. Khalaj, "New Results on the Peak Power of OFDM Signals Based on Oversampling", Proc. IEEE Int'l Conf. Commun., vol. 2, pp. 866-871, 2002.

* cited by examiner

COMPANDERS FOR PAPR REDUCTION IN OFDM SIGNALS

BACKGROUND OF THE INVENTION

1. Field of Invention

The current invention relates generally to apparatus, systems and methods for creating companders and inverse-companders. More particularly, the apparatus, systems and methods relate to a compander for OFDM signals. Specifically, the apparatus, systems and methods provide for companders based on an inverse square root (ISQR) function.

2. Description of Related Art

Orthogonal Frequency-Division Multiplexing (OFDM) is a multi-carrier communications signal modulation approach used in wireless communication standards that mitigates the primary problems associated with single-carrier, wide-band modulated signals. However, OFDM signals suffer from a critical problem. Due to the central limit theorem, an addition of many random signal components creates a Gaussian distributed signal, and thus a Rayleigh-distributed amplitude distribution. The long tail of the Rayleigh distribution gives rise to large outlier power values, thereby creating a large peak-to-average power ratio (PAPR). Several techniques have been developed to mitigate the PAPR problem, such as signal companding techniques. Recently, effective companders have been designed by piecewise modification of a signal amplitude distribution: a uniform component (UC) and a linear component (LC). Signal companders must be designed over the trade space of bit error rate performance, PAPR reduction, and out-of-band power rejection.

SUMMARY

One aspect of an embodiment of the invention includes a system for companding signals. The system includes a companding processor and a transmitter. The companding processor compands input signals into companded signals using a compander function, $C\{x(n)\}$. The compander function compands the input signals based, at least in part, on an inverse square root (ISQR) function over at least a portion of a signal amplitude probability density function. The transmitter then transmits the companded signals as electromagnetic wave signals.

Another embodiment may provide for a method for companding original signals with a compander function, $C\{x(n)\}$. The method first defines a general class of functions $\Gamma$ of the form: $g(x)=\eta f(\alpha[x-\beta])+\gamma$ wherein $\eta,\alpha,\beta,\gamma$ denote respectively, amplitude scaling, argument scaling, argument translation, and ordinate translation parameters. Values of x correspond to horizontal axis positions of a signal amplitude probability density function. The method generates the compander function, $C\{x(n)\}$, based, at least in part, on $g(x)$. The method next compands the original signals to produce companded signals that are amplitude-scaled versions of the original signal.

BRIEF DESCRIPTION OF SEVERAL VIEWS OF THE DRAWINGS

One or more example embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

In summary, the newly derived companders provide solutions over regions of an operating condition space where the prior art linear component (LC) approach fails to exist, thus expanding the solution set of companders and widening the trade space. The new closed form example embodiment compander remaps a portion of an amplitude probability distribution to a function having the inverse square root (ISQR) of scaled and shifted versions of an original amplitude value. Companding and decompanding functions are derived and numerical performance results are generated. By tolerating more PAPR, the new example embodiment companders can provide lower demodulation errors and better out-of-band power rejection.

Figure 1:
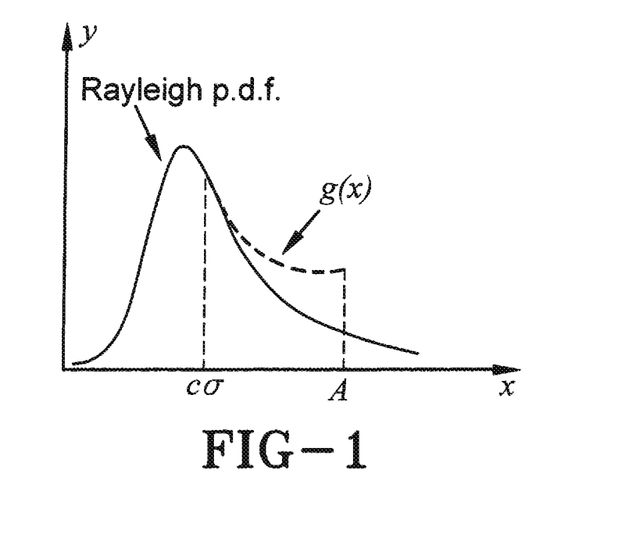
FIG. 1 is a graph of the example embodiment showing probability density function modification to limit large amplitude values.

The general approach to generating the compander family is to modify the signal amplitude probability density function between an initial point $x=c\sigma$ and the clipping point $x=A$ using a function $g(x)$ as shown notionally in FIG. 1.

The probability of the amplitude distribution in the tail past the clipping point is tucked under the $g(x)$ curve so that the probability density function integrates to unity value (a value of 1) between $x=0$ and $x=A$. From the modified amplitude distribution, companders and decompanders can be derived.

Consider a general class of functions $\Gamma$ of the form:

$$g(x)=\eta f(\alpha[x-\beta])+\gamma \tag{1}$$

where $\eta,\alpha,\beta,\gamma$ denote respectively, amplitude scaling, argument scaling, argument translation, and ordinate translation parameters. It is then characterized that the family of functions $\Gamma$ by stipulating that $g(x)$ must satisfy two properties:

1. The indefinite integral $G(x)=\int g(x)dx$ exists in closed-form; and
2. The inverse $G^{-1}(x)$ exists in closed-form.

The UC approach is a special case obtained by taking $g(x)=\gamma$. The LC approach, is a special case of the family $\Gamma$ and is obtained by using a linear function $g(x)=\alpha x+\gamma$ for which $$G(x) = \alpha \frac{x^2}{2} + \gamma x + K_I. \quad (2)$$

The trick to making the LC approach work is that the square may be completed in (2) to obtain a representation for suitable p,q,r.

$$G(x) = (px+q)^2 + r \quad (3)$$

Equation (3) may be inverted and the compander and decompander subsequently derived. The difficult part in making the formulation work for the family Γ is the presence of the translation term γ in (1). Upon integration, the term $$\int \eta f(\alpha[x-\beta])dx$$

when added to the linear integration term $\gamma x + K_I$ must produce an invertible function in closed-form.

It can be shown that Γ is wider than the set of uniform and linear functions. Consider the function g(x) containing an inverse square root component (ISQR):

$$g(x) = \frac{1}{\sqrt{\alpha(x-\beta)}} + \gamma \quad (4)$$

where x∈[cσ,A] for use as the piecewise probability density function modifier. Integrating yields $$G(x) = \frac{2}{\sqrt{\alpha}}(x-\beta)^{\frac{1}{2}} + \gamma x + K_I. \quad (5)$$

Now, one can complete the square in (5) for fractional powers. For general a,ξ,e,δ, one can write $$\left(\alpha \xi^{\frac{1}{2}} + e\right)^2 + \delta = a^2 \xi + 2ea\xi^{\frac{1}{2}} + e^2 + \delta. \quad (6)$$

In (6), take ξ=x−β to get $$\left(a(x-\beta)^{\frac{1}{2}} + e\right)^2 + \delta = 2ea(x-\beta)^{\frac{1}{2}} + a^2(x-\beta) + (e^2 + \delta). \quad (7)$$

Comparing the right side of (7) with (5) the following assignments can be made $$2ea = \frac{2}{\sqrt{\alpha}}, \; a^2 = \gamma, \; e^2 + \delta = \gamma\beta + K_I \quad (8)$$

or $$e = \frac{1}{\sqrt{\alpha\gamma}}, \; a = \sqrt{\gamma}, \; \delta = \gamma\beta - \frac{1}{\alpha\gamma} + K_I \quad (9)$$

to produce from (6)

$$G(x) = \left(a(x-\beta)^{\frac{1}{2}} + e\right)^2 + \delta. \quad (10)$$

The integration constant $K_1$ is determined as follows. By continuity, at the initial point x=cσ, the Rayleigh cumulative distribution function (c.d.f.) must equal the piecewise component, i.e.

$$1 - e^{-c^2} = \left(a(c\sigma - \beta)^{\frac{1}{2}} + e\right)^2 + \gamma\beta - \frac{1}{\alpha\gamma} + K_I \quad (11)$$

from which $K_1$, may be determined in terms of α,β,γ.

The following denotes the companding function by C which operates on the input sequence by modifying the amplitude to produce the companded output sequence y(n) =C{x(n)}. Because the compander is monotonic, then over its domain x∈[0,A] the compander may be derived as $$C\{x(n)\} = \text{sgn}\{x(n)\} F_{|y(n)|}^{-1} F_{|x(n)|}\{x(n)\} \quad (12)$$

where $F_{|x(n)|}$ denotes the c.d.f of the input and $F_{|x(n)|}$ denotes the c.d.f of the output companded signal. To derive the compander, expressions for each c.d.f in (12) are needed. The probability density function (p.d.f) of the companded signal is given by $$f_{|y(n)|}(x) = \begin{cases} \frac{2x}{\sigma^2} e^{-\left(\frac{x^2}{\sigma^2}\right)} & \text{for } 0 \le x \le c\sigma \\ \frac{1}{\sqrt{\alpha(x-\beta)}} + \gamma & \text{for } c\sigma < x \le A \\ 0 & \text{for } x > A \end{cases} \quad (13)$$

The c.d.f is obtained by integration $$F_{|y(n)|}(x) = \begin{cases} 1 - e^{-\left(\frac{x^2}{\sigma^2}\right)} & \text{for } 0 \le x \le c\sigma \\ G(x) & \text{for } c\sigma < x \le A \\ 1 & \text{for } x > A \end{cases}.$$

To determine $F_{|y(n)|}^{-1}$ invert the Rayleigh p.d.f and invert G(x) in (10) to get $$F_{|y(n)|}^{-1}(x) = \begin{cases} \sqrt{-\sigma^2 \ln(1-x)} & \text{for } 0 \le x \le 1 - e^{-c^2} \\ \left(\frac{\sqrt{x-\delta}-e}{a}\right)^2 + \beta & \text{for } \left[a(c\sigma-\beta)^{\frac{1}{2}}+e\right]^2 + \delta < x \le \left[a(A-\beta)^{\frac{1}{2}}+e\right]^2 + \delta \\ 1 & \text{for } x > \left[a(A-\beta)^{\frac{1}{2}}+e\right]^2 + \delta \end{cases} \quad (14)$$

The compander is limited to a maximum value of A the cutoff value, so from (12), the value of $F_{|y(n)|}^{-1}$ in (14) is limited to A. Therefore, the value of x in $F_{|y(n)|}^{-1}(x)$ in (14) is limited to $$x = \left[a(A-\beta)^{\frac{1}{2}} + e\right]^2 + \delta. \quad (15)$$

Using the Rayleigh c.d.f $F_{|x(n)|}$ and substituting (14) into (12), while considering the limiting value in (15), gives equation (16);

$$C\{x(n)\} = \text{sgn}\{x(n)\} \begin{cases} x & \text{for } 0 \le x \le c\sigma \\ \left(\frac{\sqrt{1-e^{-\frac{x^2}{\sigma^2}}} - \delta - e}{a}\right)^2 + \beta & \text{for } c\sigma < x \end{cases}. \quad (16)$$

Note that from the constraint that the maximum compander value is the cutoff value, from (16) we have $$\lim_{x\to\infty} C\{x\} = A \text{ or } A = \left(\frac{\sqrt{1-\delta}-e}{a}\right)^2 + \beta. \quad (17)$$

To find the inverse compander (decompander), for $c\sigma < x$ we have $$|C\{x(n)\}| = \left(\frac{\sqrt{1-e^{-\frac{x^2}{\sigma^2}}-\delta}-e}{a}\right)^2 + \beta$$

which gives $$x = \sqrt{-\sigma^2 \ln\left(1-\delta-\left[a\sqrt{|C\{x(n)\}|-\beta}+e\right]^2\right)} \quad (18)$$

and thus the decompander is given by equation 18(a):

$$C^{-1}\{x(n)\} = \text{sgn}\{x(n)\}\begin{cases} x & \text{for } 0 \le x \le c\sigma \\ \sqrt{-\sigma^2 \ln\left(1-\delta-\left[a\sqrt{x-\beta}+e\right]^2\right)} & \text{for } x > c\sigma \end{cases}$$

To complete the compander definition, appropriate values for $\alpha, \beta, \gamma$ and $A$ must be determined, given $c$ and $\sigma$. To obtain these, constraints are imposed. The first constraint is the unity c.d.f. constraint, i.e. that $$\int_0^\infty f_{|y(n)|}(x)dx = 1. \quad (19)$$

From (13):

$$\int_0^\infty f_{|y(n)|}(x)dx = \int_0^{c\sigma} \frac{2x}{\sigma^2} e^{-\frac{x^2}{\sigma^2}} dx + \int_{c\sigma}^A \frac{1}{\sqrt{\alpha(x-\beta)}} + \gamma \, dx \quad (20)$$

$$= 1 - e^{-c^2} + \left(\frac{2}{\alpha}[\alpha(x-\beta)]^{\frac{1}{2}} + \gamma x\right)\Big|_{c\sigma}^A$$

$$= 1 - e^{-c^2} + \frac{2}{\sqrt{\alpha}}\left[\sqrt{A-\beta} - \sqrt{c\sigma-\beta}\right] + \gamma(A - c\sigma).$$

Imposing constraint (19) gives $$e^{-c^2} = \frac{2}{\sqrt{\alpha}}\left[\sqrt{A-\beta} - \sqrt{c\sigma-\beta}\right] + \gamma(A - c\sigma). \quad (21)$$

For the second constraint, by definition $f_{|y(n)|}(x)$ is continuous at, $x = c\sigma$, so $$\frac{2c}{\sigma} e^{-c^2} = \frac{1}{\sqrt{\alpha(c\sigma-\beta)}} + \gamma. \quad (22)$$

For the third constraint, the average power condition is imposed on the compander. For a Rayleigh probability density function, $E[x^2] = \sigma^2$ so $$\int_0^{c\sigma} x^2 \frac{2x}{\sigma^2} e^{-\left(\frac{x^2}{\sigma^2}\right)} dx + \int_{c\sigma}^A x^2 \left(\frac{1}{\sqrt{\alpha(x-\beta)}} + \gamma\right) dx = \sigma^2. \quad (23)$$

After much simplification, one finds $$\int_0^{c\sigma} x^2 \frac{2x}{\sigma^2} e^{-\left(\frac{x^2}{\sigma^2}\right)} dx = \sigma^2 - \sigma^2 e^{-c^2}(c^2+1) \quad (24)$$

and $$\int_{c\sigma}^A x^2 \left(\frac{1}{\sqrt{\alpha(x-\beta)}} + \gamma\right) dx = \Lambda(A) - \Lambda(c\sigma) + \left[\frac{\gamma A^3}{3} - \frac{\gamma(c\sigma)^3}{3}\right] \quad (25)$$

where $$\Lambda(x) = \frac{2}{5\alpha^3}[\alpha(x-\beta)]^{\frac{5}{2}} + \frac{4\alpha\beta}{3\alpha^3}[\alpha(x-\beta)]^{\frac{3}{2}} + \frac{2(\alpha\beta)^2}{\alpha^3}[\alpha(x-\beta)]^{\frac{1}{2}}. \quad (26)$$

Substituting (25) together with (24) into (23) gives $$\sigma^2 = [\sigma^2 - \sigma^2 e^{-c^2}(c^2+1)] + [\Lambda(A) - \Lambda(c\sigma)] + \left[\frac{\gamma A^3}{3} - \frac{\gamma(c\sigma)^3}{3}\right]. \quad (27)$$

Collecting (21), (22), and (27) together with (17), (11), and (9) gives us four nonlinear equations in the four unknowns $\alpha, \beta, \gamma, A$ for given $c, \sigma$.

From (22) one can solve for $\gamma$ as a function of $\alpha, \beta$ to get $\gamma = f_1(\alpha, \beta)$. From (21), one can solve for $\alpha$ as a function of $\beta$ to get $\alpha = f_2(\beta)$. Using $\gamma = f_1(\alpha, \beta)$ in (27), one can solve for $\alpha$ as a function of $\beta$ to get $\alpha = f_3(\beta)$. Then one can then use (17) to calculate $A$. Under suitable constraints and for certain values of $A, c$, then $\alpha, \beta$ can be found numerically from $f_2$, $f_3$, and $\gamma$ can be found from $f_1$. From (21) it can be seen that $\beta < c\sigma$ and therefore $\alpha > 0$.

Actual Numerical Results

In this section regions of the operating conditions space are investigated where the LC approach fails to exist, but where the ISQR approach has solutions. Then actual simulation results are presented for a case where the ISQR approach provides a solution where the LC approach fails.

Failure of LC Solutions

To meet the average power constraint, the cutoff value $A$ must satisfy a quintic polynomial, $a_5 A^5 + a_4 A^4 + a_3 A^3 + a_2 A^2 + a_1 A + a_0 = 0$ where $a_5 = -2c$ $a_4 = 6c^2\sigma + 3\sigma$ $a_3 = -4c^3\sigma^2 - 4c\sigma^2$ $a_2 = -4c^4\sigma^3 - 6c^2\sigma^3 - 6\sigma^3$ $a_1 = 6c^5\sigma^4 + 12c^3\sigma^4 + 12c\sigma^4$ $a_0 = -2c^6\sigma^5 - 5c^4\sigma^5 - 6c^2\sigma^5$.

Solutions to this polynomial are constrained to be real and must satisfy $c\sigma < A$. As $c$ increases, the average power constraint can cause the LC approach to fail to exist.

Furthermore, as values of $A$ increase, the LC approach will fail as the area under the linear curve becomes too large for the probability density function to integrate to unity value, thus violating the unity c.d.f. constraint. To see this, the linear component is given by $$f(x) = Kx + \frac{2c}{\sigma}e^{-c^2} - Kc\sigma \quad (28)$$

which, from the unity c.d.f. constraint, implies $$K = \frac{2[2c^2\sigma - 2cA + \sigma]}{\sigma(A - c\sigma)^2}e^{-c^2}. \quad (29)$$

To find the x-intercept set $f(x)=0$ in (28), substitute (29) into (28) and solve for x to get $$x = \frac{\sigma^2 c^3 + (\sigma^2 - A^2)c}{2c^2\sigma - 2cA + \sigma}. \quad (30)$$

For $$A > \frac{(2c^2 + 1)\sigma}{2c}$$

then K<0, and the LC solution fails to exist if the x-intercept falls below the cutoff value, i.e.

$$\frac{\sigma^2 c^3 + (\sigma^2 - A^2)c}{2c^2\sigma - 2cA + \sigma} < A. \quad (31)$$

For example, if c=1 then (30) becomes A>(3/2)σ and (31) becomes $$\frac{2\sigma^2 - A^2}{3\sigma - 2A} < A \quad (32)$$

or $$0 < (A - 2\sigma)(A - \sigma).$$

Hence for A>2σ, then K<0 and (32) holds, which means the LC solution fails to exist.

Figure 2:
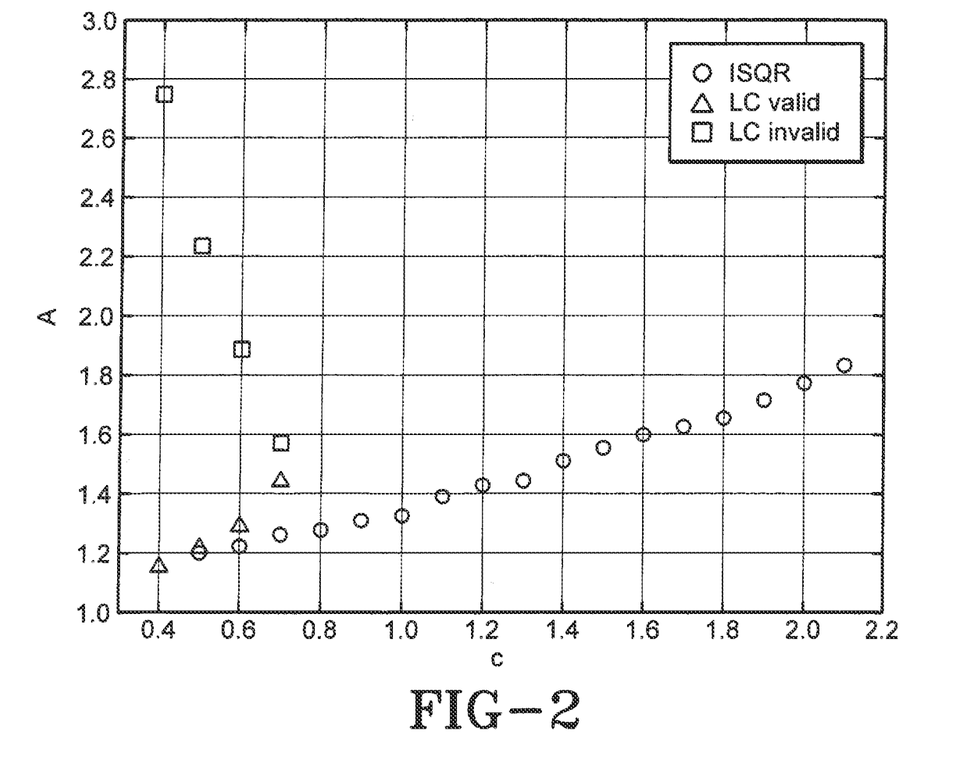
FIG. 2 is a graph showing parameter regions where the LC approach fails but the ISQR approach exists.
Figure 3:
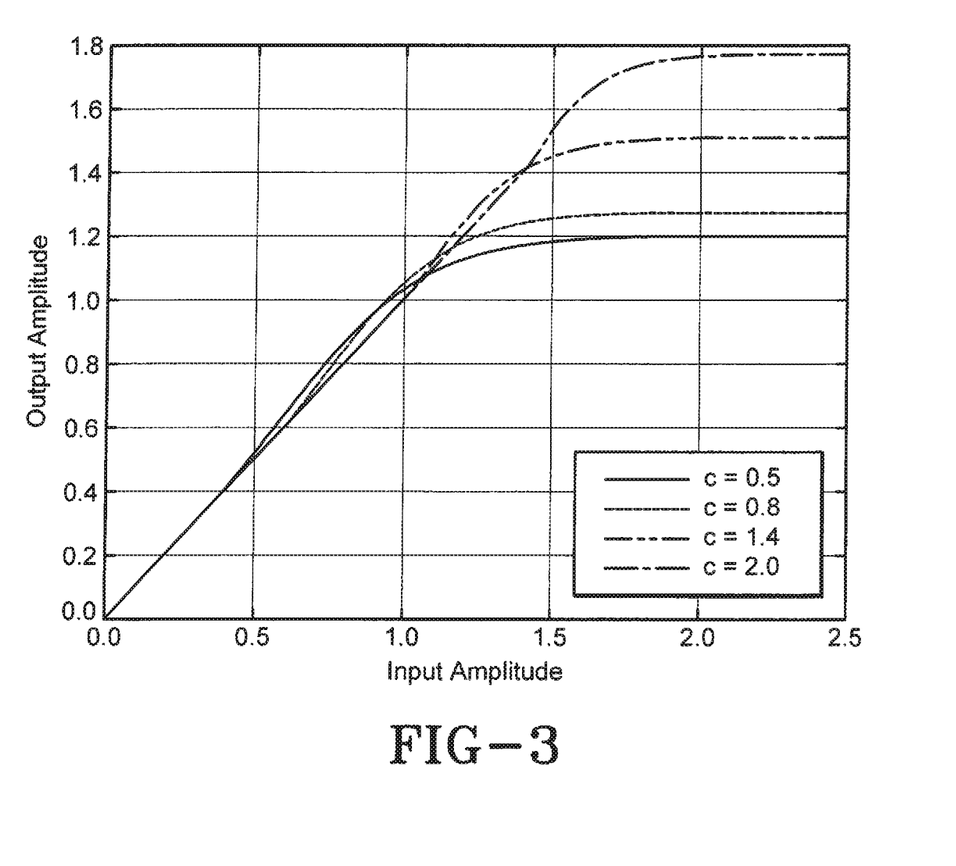
FIG. 3 is a graph showing sample companding functions for the ISQR approach.

On regions of the operating conditions space where the average power constraint or the unity c.d.f constraint are violated, the LC approach will fail. However, the ISQR approach can still exist. FIG. 2 shows regions of the operating conditions space where the ISQR approach has solutions but the LC approach fails. The invalid LC solutions correspond to regions where the average power condition fails.

Actual Simulations

Consider a scenario in which the power amplitude has a wide linear region, so that the cutoff value may be pushed into the range where the LC approach fails to exist. In this scenario, with a larger cutoff value, more PAPR may be tolerated. Actual simulation results are presented showing that the ISQR approach can provide better performance for certain performance metrics, then the best-case results from the LC approach over its range of operation.

Actual simulation results were generated for a QPSK modulated OFDM signal with sixty four subcarriers over an additive white Gaussian noise channel. Ten thousand realizations of signal-plus-noise were generated for each noise power. For the Rayleigh p.d.f. in (13), $\sigma=\sqrt{2}/2$ was chosen. An oversampling factor of four was used so that the discrete PAPR reasonably approximates the PAPR from a continuous system. PAPR reduction was measured using the complimentary cumulative distribution function (CCDF) which gives the probability that the PAPR is above a given threshold value. Symbol error rates to measure demodulation performance, and power spectrums to measure out-of-band power reduction were also generated.

Figure 4:
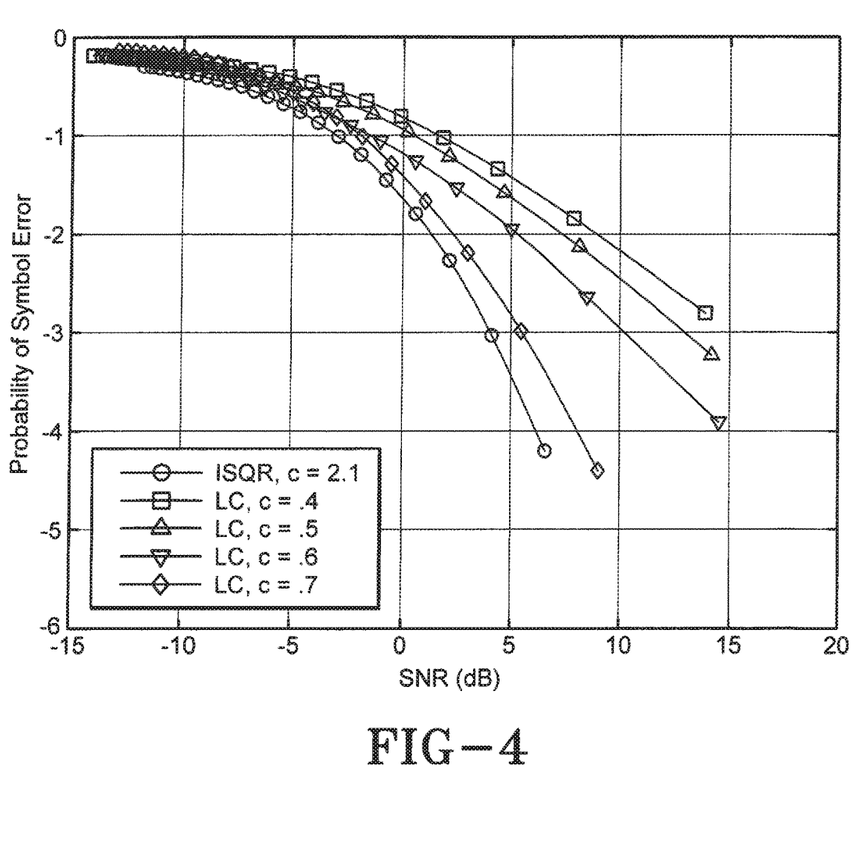
FIG. 4 is a graph showing symbol error rate performance.

FIG. 4 contains symbol error plots for the four valid LC approach solutions shown in FIG. 2, and the ISQR approach for c=2.1. The ISQR solution is a solution that is not achievable with the LC approach. FIG. 4 shows that the ISQR approach provides a lower symbol error rate than the LC approach.

Figure 5:
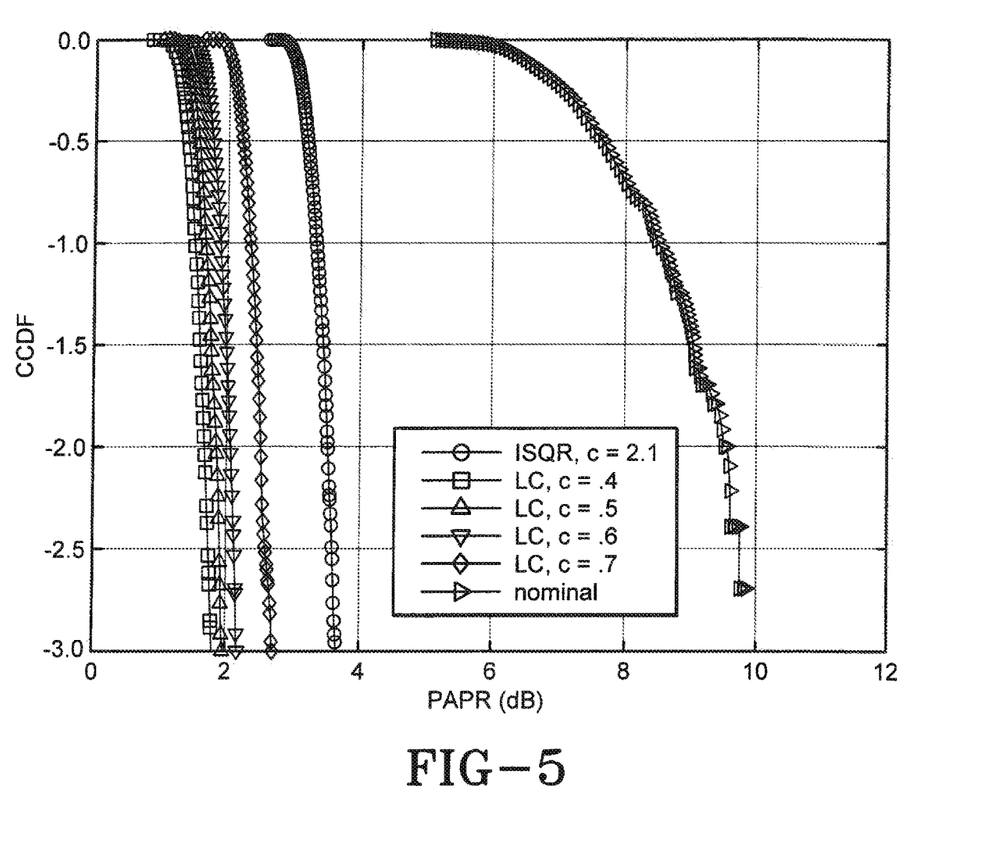
FIG. 5 is a graph showing PAPR performance: LC, ISQR, and nominal.

This improvement in symbol error rate comes at the cost of reduced PAPR relative to the LC approach. FIG. 5 contains the CCDF results and shows that the LC approach provides better PAPR reduction, however the ISQR approach still provides a significant PAPR reduction over the nominal approach using no companding.

Figure 6:
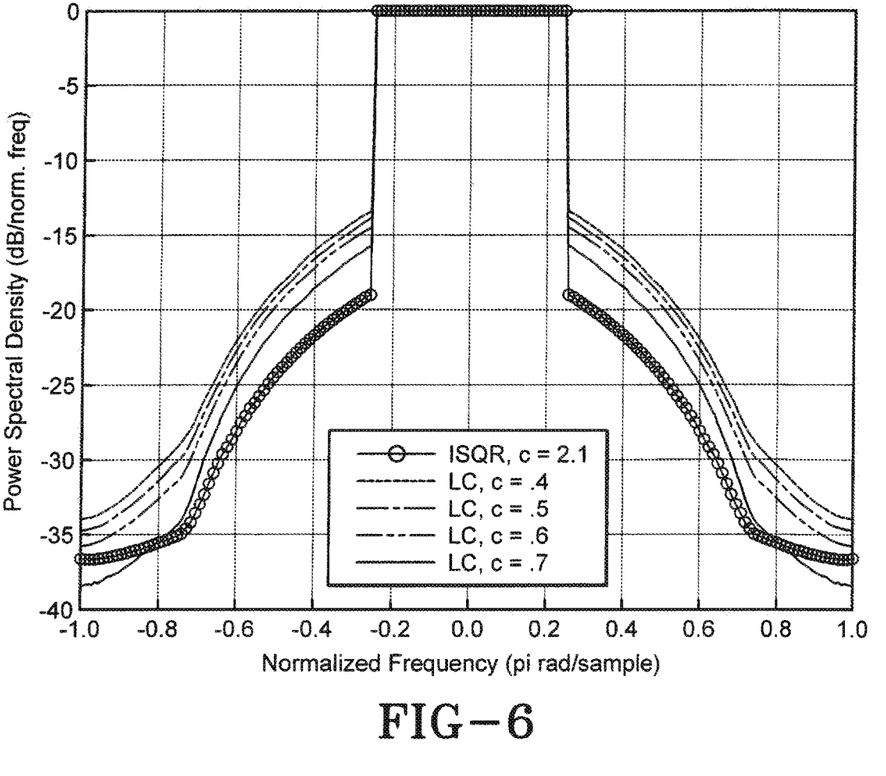
FIG. 6 is a graph showing improved out-of-band power rejection for the ISQR method.

However, the ISQR approach can provide a significant performance improvement in out-of-band power rejection over the LC approach. This performance improvement is shown in FIG. 6 which contains the power spectrum for the ISQR approach and the LC approach. The ISQR approach shows an improvement of between more than 3 dB to over 5.5 dB in out-of-band power rejection over the LC approach.

Hence if the PAPR constraint can be relaxed, then the ISQR approach can provide significantly better PAPR reduction over the nominal case, while achieving improved symbol error rate and out-of-band power rejection over the best LC case, for a solution that is not attainable using the LC approach.

Figure 7:
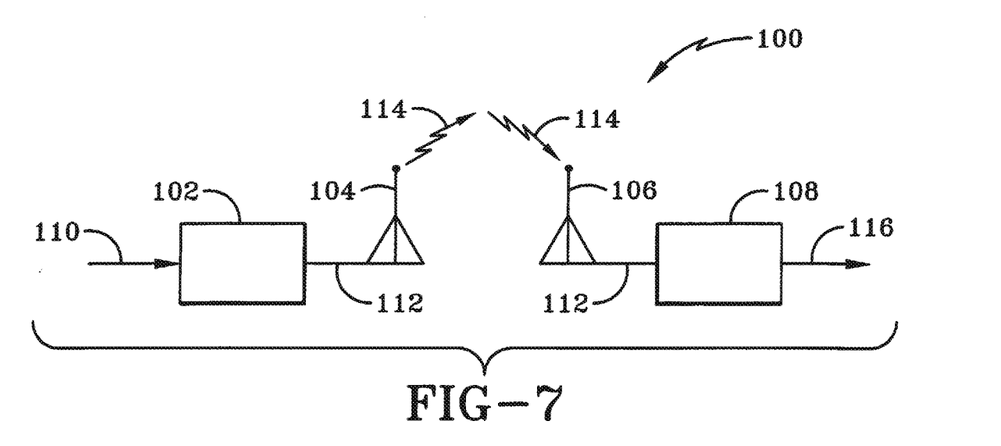
FIG. 7 illustrates an example system that compands and decompands signals based on the ISQR approach.

FIG. 7 illustrates an example embodiment of a system 100 that compands input signals 110 based, at least in part, on the ISQR function as defined earlier by:

$$g(x) = \frac{1}{\sqrt{\alpha(x-\beta)}} + \gamma$$

where α,β,γ denote respectively, argument scaling, argument translation, and ordinate translation parameters; and where values of "x" correspond to horizontal axis positions of the amplitude probability density function. The system 100 includes a companding processor 102, a transmitting antenna 104, a receiving antenna 106 and a decompanding processor 108. "Processor" and "Logic", as used herein, includes but are not limited to hardware, firmware, software and/or combinations of each to perform a function(s) or an action(s), and/or to cause a function or action from another logic, method, and/or system. For example, based on a desired application or needs, logic and/or processor may include a software controlled microprocessor, discrete logic, an application specific integrated circuit (ASIC), a programmed logic device, a memory device containing instructions, or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

The companding processor 102 compands input signals 110 into companded signals 112 using compander function, C{x(n)}. The compander function compands the input signals 110 based, at least in part, on an inverse square root (ISQR) function over at least a portion of a probability density function. The transmitter 104 transmits the companded signals 112 as electromagnetic wave signals 114 out the transmit antenna 104. The receiver antenna 106 receives the companded signals electromagnetic signals 114. The decompanding processor 108 then decompands the companded signals according to a decompanding function based, at least in part, on the ISQR function to generate decompanded output signals 116.

In other configurations, the companding processor 102 may further compand the input signals 110 according to the companding equation discussed above:

$$C\{x(n)\} = \text{sgn}\{x(n)\} \begin{cases} x & \text{for } 0 \le x \le c\sigma \\ \left(\dfrac{\sqrt{1-e^{-\frac{x^2}{\sigma^2}} - \delta} - e}{a}\right)^2 + \beta & \text{for } c\sigma < x \end{cases}$$

As discussed above, "$\sigma$" corresponds to a standard deviation of the probability density function, "$c\sigma$" is a starting point of the ISQR function on the probability density function, "$\xi$" represents a translation of the variable "x", "a" corresponds to a scale parameter on the square root of the argument "$\xi$", "e" is a parameter that controls the translation of the scaled square root of "$\xi$", and "$\delta$" represents an additional translation parameter.

In other configurations of the system 100, the decompanding processor 108 can decompand the companded signals 112 according to that decompanding equation that were discussed above:

$$C^{-1}\{x(n)\} = \text{sgn}\{x(n)\} \begin{cases} x & \text{for } 0 \le x \le c\sigma \\ \sqrt{-\sigma^2 \ln\left(1 - \delta - \left[a\sqrt{x-\beta} + e\right]^2\right)} & \text{for } x > c\sigma \end{cases}$$

Again, as discussed above, "$\sigma$" corresponds to a standard deviation of the probability density function, "$\xi$" represents a translation of the variable "x", "a" corresponds to a scale parameter on the square root of the argument "$\xi$", "e" is a parameter that controls the translation of the scaled square root of "$\xi$", and "$\delta$" represents an additional translation parameter.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the example embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the example embodiment" does not necessarily refer to the same embodiment, though it may.

What is claimed is:

1. A method for companding input signals wherein the method provides improved peak-to-average power ratio (PAPR) tolerance, reduced demodulation errors and improved out-of-band power rejection, the method comprising:

defining a general family of functions $\Gamma$ of the form:

$$g(x) = \eta f(\alpha[x-\beta]) + \gamma$$

wherein $\eta, \alpha, \beta, \gamma$ denote respectively, amplitude scaling, argument scaling, argument translation, and ordinate translation parameters;
   wherein values of x correspond to horizontal axis positions of a signal amplitude probability density function;
   generating a compander function, C{x(n)}, based, at least in part, on g(x);
   companding the input signals using the compander function, C{x(n)} to produce companded signals that are scaled versions of the input signals and of input amplitude values of the input signals;
   wherein the compander function compands the input signals based, at least in part, on an inverse square root (ISQR) function over at least a portion of a probability density function, and wherein the companding of the input signals is based, at least in part, on the ISQR function defined by:

$$g(x) = \dfrac{1}{\sqrt{\alpha(x-\beta)}} + \gamma$$

where $\alpha, \beta, \gamma$ denote respectively, argument scaling, argument translation, and ordinate translation parameters; and where values of "x" correspond to horizontal axis positions of the signal amplitude probability density function; and
   transmitting the companded signals for orthogonal frequency division multiplexed (OFDM) wireless communications.

2. The method of claim 1 further comprising:
   generating an inverse compander function, $C^{-1}\{x(n)\}$, based, at least in part, on |C{x(n)}|.

3. The method of claim 1 wherein the family of F is wider than a prior art set of uniform and linear functions.

4. The method of claim 1 wherein companding is not based on the uniform compander (UC) approach.

5. The method of claim 1 wherein companding is not based on the linear compander (LC) approach.

6. The method of claim 1 further comprising:
   g(x) satisfies: (1) the indefinite integral $G(x) = \int g(x)dx$ exists in closed-form; and (2) the inverse $G^{-1}(x)$ exists in closed-form.

7. The method of claim 1 further comprising:
   g(x) is defined to exist in a span of the probability density function between an initial point $x = c\sigma$ and a clipping point of $x = A$.

8. The method of claim 7 further comprising:
wherein the compander function is:

$$C\{x(n)\} = \text{sgn}\{x(n)\}\begin{cases} x & \text{for } 0 \leq x \leq c\sigma \\ \left(\dfrac{\sqrt{1-e^{-\frac{x^2}{\sigma^2}}-\delta}-e}{a}\right)^2 + \beta & \text{for } c\sigma < x \end{cases}$$

wherein "σ" corresponds to a standard deviation of the probability density function, "ξ" represents a translation of the variable "x", "a" corresponds to a scale parameter on the square root of the argument "ξ", "e" is a parameter that controls the translation of the scaled square root of "ξ", and "δ" represents an additional translation parameter.

9. The method of claim 7 further comprising:
wherein a corresponding inverse-compander function is:

$$C^{-1}\{x(n)\} = \text{sgn}\{x(n)\}\begin{cases} x & \text{for } 0 \leq x \leq c\sigma \\ \sqrt{-\sigma^2 \ln\left(1-\delta-\left[a\sqrt{x-\beta}+e\right]^2\right)} & \text{for } x > c\sigma \end{cases}$$

wherein "σ" corresponds to a standard deviation of the probability density function, "ξ" represents a translation of the variable "x", "a" corresponds to a scale parameter on the square root of the argument "ξ", "e" is a parameter that controls the translation of the scaled square root of "ξ", and "δ" represents an additional translation parameter.

10. The method of claim 1 wherein the compander function is implemented in a silicon semiconductor chip.

11. A system for companding input signals wherein the system provides improved peak-to-average power ratio (PAPR) tolerance, reduced demodulation errors and improved out-of-band power rejection, the system comprising:
a companding processor to compand input signals into companded signals using compander function, C{x(n) }; wherein the compander function compands the input signals based, at least in part, on an inverse square root (ISQR) function over at least a portion of a probability density function; and
a transmitter to transmit the companded signals as electromagnetic wave signals for orthogonal frequency division multiplexed (OFDM) wireless communications;
wherein the companding processor compands the input signals based, at least in part, on the ISQR function defined by:

$$g(x) = \dfrac{1}{\sqrt{\alpha(x-\beta)}} + \gamma$$

where α,β,γ denote respectively, argument scaling, argument translation, and ordinate translation parameters; and where values of "x" correspond to horizontal axis positions of the signal amplitude probability density function.

12. The of claim 11 wherein the companding processor is configured to compand the input signals according to:

$$C\{x(n)\} = \text{sgn}\{x(n)\}\begin{cases} x & \text{for } 0 \leq x \leq c\sigma \\ \left(\dfrac{\sqrt{1-e^{-\frac{x^2}{\sigma^2}}-\delta}-e}{a}\right)^2 + \beta & \text{for } c\sigma < x \end{cases}$$

wherein "σ" corresponds to a standard deviation of the probability density function, "cσ" is a starting point of the ISQR function on the probability density function, "ξ" represents a translation of the variable "x", "a" corresponds to a scale parameter on the square root of the argument "ξ", "e" is a parameter that controls the translation of the scaled square root of "ξ", and "δ" represents an additional translation parameter.

13. The system of claim 11 further comprising:
a receiver configured to receive the companded signals.

14. The of claim 13 wherein the receiver further comprises:
a decompanding processor configured to decompand the companded signals according to the decompanding function:

$$C^{-1}\{x(n)\} = \text{sgn}\{x(n)\}\begin{cases} x & \text{for } 0 \leq x \leq c\sigma \\ \sqrt{-\sigma^2 \ln\left(1-\delta-\left[a\sqrt{x-\beta}+e\right]^2\right)} & \text{for } x > c\sigma \end{cases}$$

wherein "σ" corresponds to a standard deviation of the probability density function, "ξ" represents a translation of the variable "x", "a" corresponds to a scale parameter on the square root of the argument "ξ", "e" is a parameter that controls the translation of the scaled square root of "ξ", and "δ" represents an additional translation parameter.

* * * * *